United States Patent [19]
Apfel et al.

[11] 4,309,075
[45] Jan. 5, 1982

[54] MULTILAYER MIRROR WITH MAXIMUM REFLECTANCE

[75] Inventors: Joseph H. Apfel; Charles K. Carniglia, both of Santa Rosa, Calif.

[73] Assignee: Optical Coating Laboratory, Inc., Santa Rosa, Calif.

[21] Appl. No.: 82,230

[22] Filed: Oct. 5, 1979

[51] Int. Cl.$^3$ .............................................. G02B 1/10
[52] U.S. Cl. .................................................. 350/164
[58] Field of Search ............................. 350/164–166, 350/1.6, 1.7, 288, 298, 299

[56] References Cited

U.S. PATENT DOCUMENTS 3,887,261  6/1975  Spiller ................................. 350/164

OTHER PUBLICATIONS

Koppelmann, Von G., "Zur Theorie der Wechselschichten aus schwachabsorbierenden Substanzen und ihre Verwendung als Interferometerspiegal," *Annalen der Physik*, 7 Folge., Band 5, pp. 388–396, 1960.
Sparks, M. and Flannery, M., "Simplified Description of Multilayer Dielectric Reflectors,". *J. Opt. Soc. Am.*, vol. 69, No. 7, Jul. 1979.
Lissberger, P. H., "The Ultimate Reflectance of Multilayer Dielectric Mirrors," *Optica Acta*, vol. 25, No. 4, pp. 291–298, 1978.
DeBell, Gary W., "The Design and Measurement of Low Absorptance Optical Interference Coatings," Ph.D. Thesis, The Institute of Optics, The University of Rochester, Rochester, N.Y., 1972.
Apfel, Joseph H., "Optical Coating Design with Reduced Electric Field Intensity," *Applied Optics*, vol. 16, p. 1880, Jul. 1977.
Spiller, E., "Low-Loss Reflection Coatings Using Absorbing Materials," *Appl. Phys. Lett.*, vol. 20, p. 365 (1972).
Spiller, E., "Multilayer Interference Coatings for the Vacuum Ultraviolet," *Space Optics*, ISBN 0-309-021-44-8, National Academy of Sciences, Washington, D.C., 1974.
Spiller, E., "High Quality Fabry-Perot Mirrors for the Ultraviolet," *Optik*, vol. 39, (No. 2), 118-125, (1973).
Spiller, E., "Reflective Multilayer Coatings for the Far UV Region," *Applied Optics*, vol. 15, No. 10, 2333, Oct. 1976.

*Primary Examiner*—John K. Corbin
*Assistant Examiner*—Bruce Y. Arnold
*Attorney, Agent, or Firm*—Flehr, Hohbach, Test, Albritton & Herbert

[57] ABSTRACT

A high reflectance mirror utilizing a dielectric stack having multiple layers of low and high refractive index material, at least one of which is absorbing at the design wavelength. At least one pair of layers is formed on a substructure with the thickness of the individual layers being both different from a quarterwave optical thickness and preselected to maximize the reflectance of the mirror. Mirrors in which both dielectric materials in the stack have different absorptances at the design wavelength are disclosed with the layer thickness of one or more optimum pairs formed on a substructure being different from a quarterwave optical thickness such that the layers of higher absorptance material are less than a quarterwave optical thickness and the layers of lower absorptance material are more than a quarterwave optical thickness. The individual thicknesses of the layers are optimized to provide maximum reflectance, leading to a non-periodic stack when a substantial number of such optimum pairs of layers are utilized.

11 Claims, 12 Drawing Figures

OPS = OPTIMUM PAIRS STACK
QWS = QUARTER WAVE STACK

MULTILAYER MIRROR WITH MAXIMUM REFLECTANCE

This invention relates generally to optical coatings and, more specifically, to multilayer dielectric coatings for high reflectance mirrors.

Figure 1:
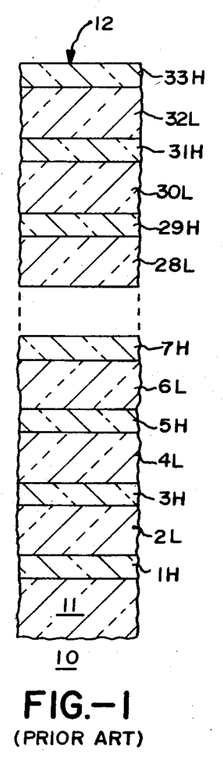
FIG. 1 is a fragmented cross-sectional view of a multilayer mirror utilizing a quarterwave stack in accordance with the prior art.

Multilayer dielectric reflectors are widely used in applications such as laser mirrors which require especially high reflectance at a design wavelength. This type of thin film reflector is generally made with materials which have minimal absorption, and the optical coating consists of alternate layers of high and low refractive index materials. In accordance with one type of prior art mirror, high reflectance is achieved by choosing the optical thickness of each layer to be a quarter of the design wavelength. Typically, a larger number of pairs of quarterwave layers is used to achieve a high total reflectance value. Such an optical coating is commonly called a "quarterwave stack" and will be referred to herein by the initials QWS. FIG. 1 of the attached drawings shows a prior art multilayer mirror 10 comprising a thirty-three layer QWS 12 formed on a glass substrate 11. In FIG. 1 (and in FIGS. 2, 3, 7 and 8) no attempt has been made to depict the physical thicknesses of the low and high index layers to actual scale for any particular set of materials, but only to illustrate generally the relative geometric characteristics of various dielectric stack designs.

In the absence of absorption and scattering of the incident light, the addition of each pair of high and low refractive index layers to a QWS increases the total reflectance of the optical coating. Theoretically, one can approach arbitrarily close to a reflectance of unity by the addition of a sufficient number of layers. In practice, small amounts of absorption in the coating materials themselves place an upper limit on the reflectance which can be achieved with a QWS. This upper limit was originally predicted by G. Kopplemann in a 1960 article entitled "The Theory of Multilayers Consisting of Weakly Absorbing Materials and Their Use as Interferometer Mirrors" appearing in Ann. Phys. (Leipz), Volume 5, page 388. Hence this upper limit is generally referred to as the Kopplemann limit.

Figure 4:
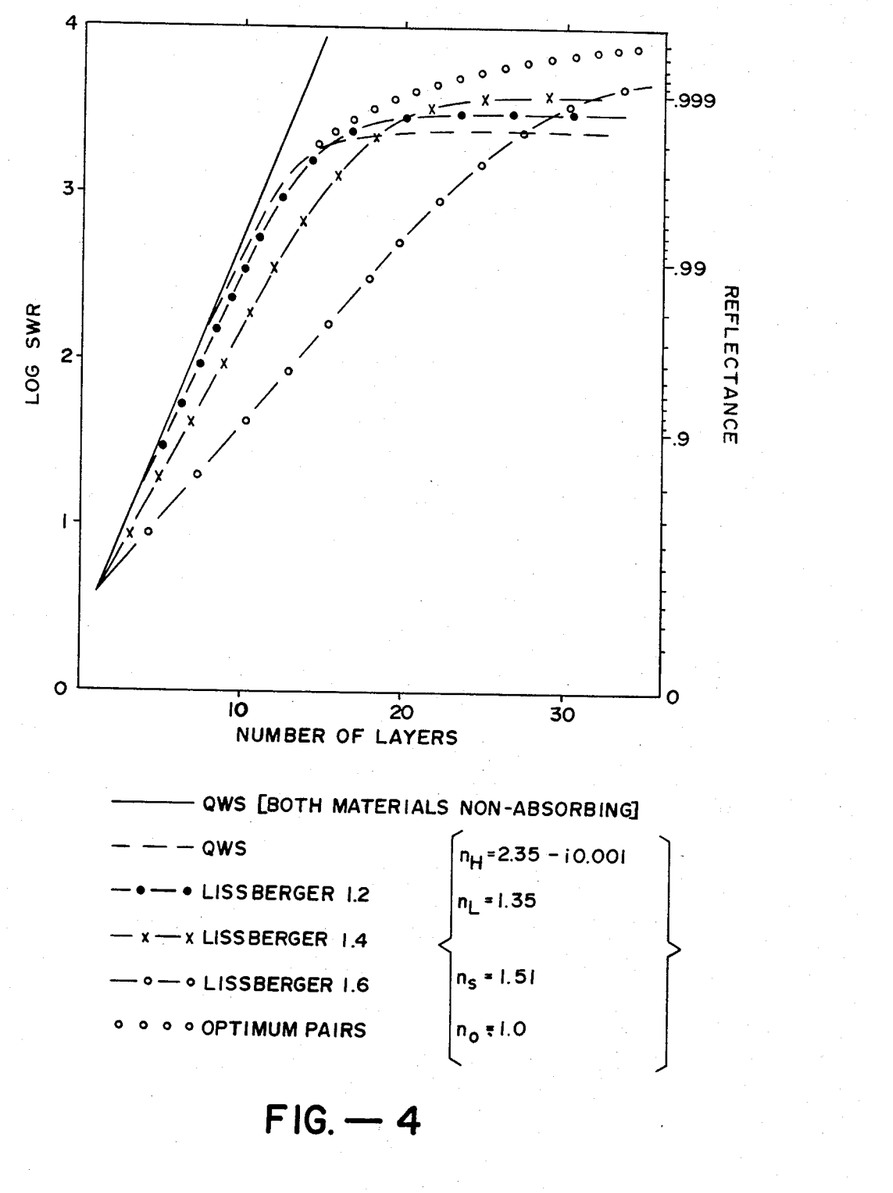
FIG. 4 is a graph useful in comparing the optical performance of multilayer mirrors constructed in accordance with certain prior art approaches with a multilayer mirror in accordance with a preferred embodiment of this invention.

FIG. 4 of the drawings shows, among other things, the relative optical performance of a non-absorbing QWS (a solid line on the graph) and a QWS in which the high refractive index material has a small amount of absorption (a dashed line on the graph). The left hand scale gives optical performance in terms of the log of the standing wave ratio (SWR). The right hand scale gives the optical performance in the terms of reflectance versus the number of layers. The values for the various refractive indices are given on the graph, except that for the non-absorbing QWS $n_H = 2.35$.

Comparing the solid and dashed lines in FIG. 4, it is seen that for the first few pairs of layers, the SWR (and reflectance) of an absorbing QWS keeps pace with the non-absorbing QWS. However, after about eighteen layers have been built up, the SWR of the absorbing QWS saturates at a value of 2355 corresponding to a value of 0.9983 for the reflectance. This value agrees with the limit predicted by Kopplemann for a QWS.

In a July 1979 article in the *Journal of the Optical Society of America*, Volume 69, no. 7, page 993, M. Sparks and M. Flannery demonstrated that, for a QWS reflector designed for a particular wavelength and using slightly absorbing materials, the absorption in the materials causes the peak reflectance to occur at a wavelength other than the design wavelength. It is possible to shift the center of the QWS so that the peak reflectance is at the original design wavelength and thus achieve reflectances exceeding the Kopplemann limit. Of course, with this shifted stack, the optical thickness of the layers is no longer equal to a quarter of the design wavelength and is thus technically not a QWS. However, in Sparks' reflector all layers of high and low refractive index materials have the same optical thickness and therefore it is a periodic design. Accordingly, each layer of high or low index material has the same physical thickness as all other layers of high or low index material respectively.

Other investigators have also suggested the use of non-quarter wave layers in the design of mirrors to exceed the Kopplemann limit. In a 1978 article in *OPTICA ACTA*, Volume 25, No. 4, page 291, P. H. Lissberger demonstrates that, for a case in which the low refractive index material has no absorption, it is possible to exceed the Kopplemann reflectance limit. According to Lissberger, by proper choice of the film thicknesses, it is possible to approach arbitrarily close to a reflectance of unity. Lissberger's approach involves a periodic stack of alternate high and low refractive index layers and selection of a target value for the reflectance to be achieved by the design. This target value determines the appropriate thickness to be used for all of the high refractive index layers, and the corresponding thicknesses for all of the low refractive index layers. A certain total number of layers is required to reach the target reflectance value or the saturation level of the reflectance. If the target reflectance is changed, the thicknesses of the high and low refractive index layers are changed and a different number of layers is required to achieve that target reflectance.

Figure 2:
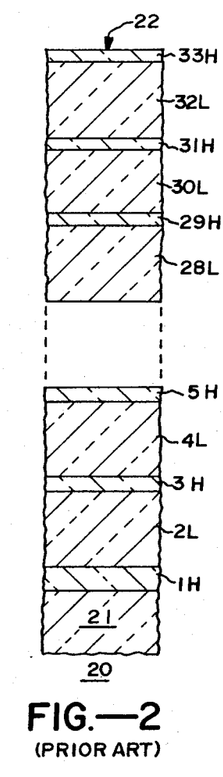
FIG. 2 is a fragemented cross-sectional view of a multilayer mirror utilizing a stack of dielectric layers in accordance with the prior art Lissberger approach.

FIG. 2 of the attached drawings shows a high reflectance mirror 20 which is an adaptation of a Lissberger design, having a thirty-three layer stack 22 formed on a glass substrate 21. This design is for a case in which the high refractive index material is slightly absorbing. In this example, the low refractive index material is cryolite which has a negligible absorption and a refractive index of 1.35. The high index material is zinc sulfide (ZnS) whose complex refractive index is given by $n_H = 2.35 - i0.001$. As can be seen from contrasting FIG. 1 with FIG. 2, the Lissberger stack is, like the QWS, periodic in that all high refractive index layers have the same thickness and all low index layers have the same thickness, but the layers of low refractive index material are thicker than a quarterwave and layers of high refractive index material are thinner than a quarterwave.

In FIG. 4 of the attached drawings, three graphs are shown which compare the reflectance of various Lissberger stack designs with that of an absorbing QWS in terms of the number of layers in the respective stacks. It will be observed from these graphs that the reflectance of the Lissberger stack is initially less than that of a QWS and only exceeds that of a QWS after a large number of layers has been formed. It is apparent that, using Lissberger's approach, in order to achieve values of reflectance close to unity, an extremely large number of layers is required.

Figure 7:
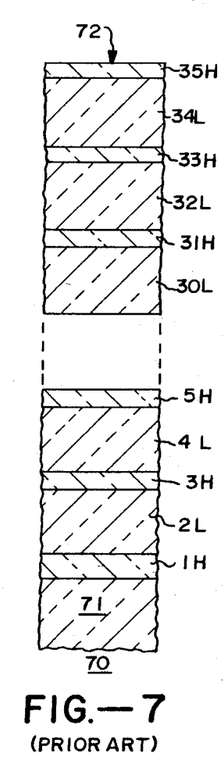
FIG. 7 is a fragmented cross-sectional view of a multilayer mirror utilizing a stack of layers formed in accordance with the prior art DeBell design approach.

In a 1972 Ph.D thesis at the University of Rochester, G. W. DeBell developed a method of designing high reflectivity mirrors in the case that both the high and low refractive index materials are absorbing. DeBell's approach involves choosing the thickness of the layers in such a way as to minimize absorptance in the optical coating. FIG. 7 of the attached drawings shows a high reflectance mirror 70 constructed in accordance with a DeBell design and having a thirty-five layer stack 72 formed on a glass substrate 71. This design is for a case in which both the high and low refractive index materials are slightly absorbing. Specifically, in this case, the high refractive index material is zinc sulfide whose complex refractive index is given by $n_H = 2.35 - i0.001$ and the low refractive index material is silicon dioxide whose complex refractive index is given by $n_L = 1.47 - i0.0001$. DeBell's design in this case is similar to Lissberger's design in that it is essentially periodic. More specifically, DeBell's design involves low refractive index layers of the same thickness and high refractive index layers which vary in thickness only for the first five or six layers formed on the substrate. Thereafter, both the thicknesses of the low refractive index material and the high refractive index material are constant. According to the DeBell design, the layer of higher absorptance has an optical thickness less than a quarterwave optical thickness and the layer of lesser absorptance has an optical thickness greater than a quarterwave.

Figure 9:
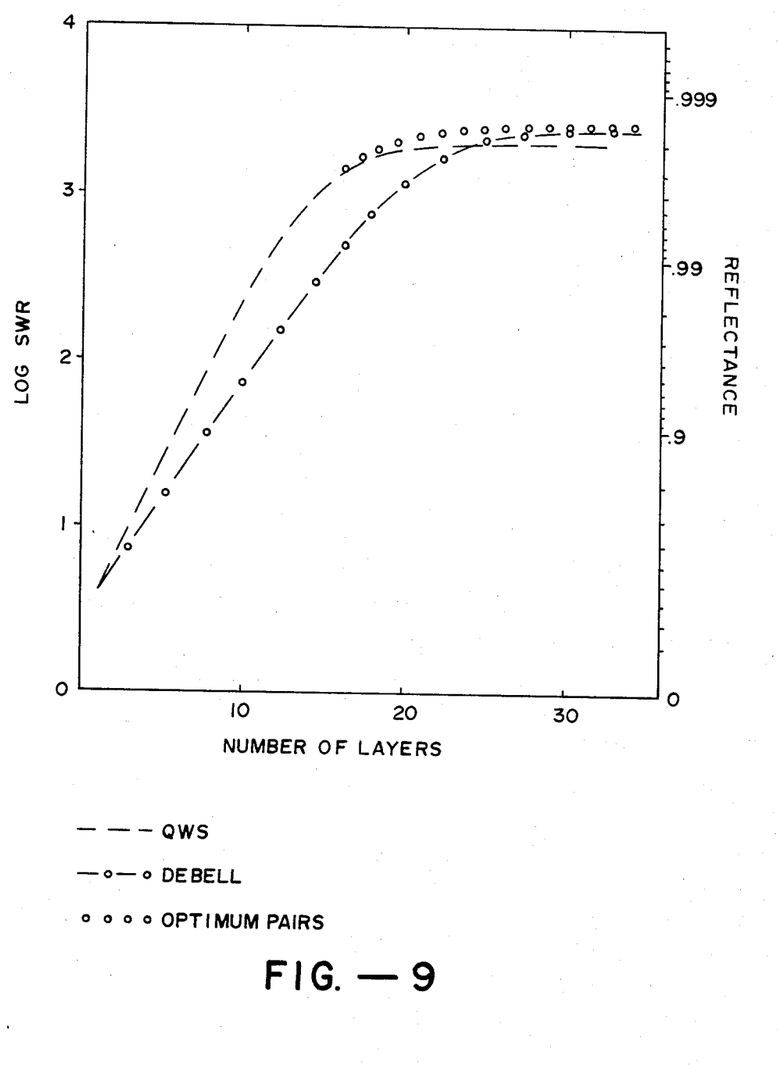
FIG. 9 is a graph useful in comparing the optical performance of a multilayer mirror in accordance with this invention with multilayer mirrors constructed in accordance with certain prior art approaches.

FIG. 9 of the attached drawings shows, among other things, comparison graphs of the reflectance of a QWS versus that of a DeBell stack as the number of layers in each increases. Similar to the Lissberger stack, the DeBell stack has lower reflectance than the QWS until a larger number of layers has been formed on the substrate. In this case, the cross-over point is at about twenty-three or twenty-four layers. Only thereafter does the reflectance of the DeBell stack exceed that of the QWS. It can be shown, however, that the DeBell stack has somewhat lower absorptance than the QWS stack throughout the whole range of layers in the stack. DeBell also suggests a hybrid stack arrangement involving starting with fifteen or seventeen quarterwave layers followed by DeBell's periodic stack with low refractive index layers of fixed thickness to reduce the number of layers required to reach the limiting reflectance value. However, DeBell's approach of adjusting the film thicknesses to provide minimum absorption does not work if only one material is absorbing, since the resulting design would require elimination of the absorbing material from the optical coating. Moreover, DeBell's approach does not optimize the reflectance value for each pair of layers added to the stack.

In a July 1977 article in Applied Optics, Vol. 16, No. 7, page 1880, J. H. Apfel suggests the use of non-periodic, non-quarterwave pairs of layers in a multilayer mirror for the purpose of shifting the peak electric field intensity of the incident radiation away from the interface between the high and low index materials and into the lesser absorbing of the two materials. A mirror produced according to the design approach set forth in this article might have higher reflectance than a quarterwave stack, but would not achieve the maximum reflectance value attainable with the number of layers utilized.

In accordance with one aspect of this invention a multilayer mirror is provided in which alternate layers of two materials of different refractive indices and different absorptances are formed in pairs on a substructure with the thicknesses of the layers in each pair having values which have been predetermined substantially to maximize the overall reflectance of the mirror. The term substructure refers to either a dielectric or metal substrate by itself or one with one or more layers of material formed thereon.

In accordance with another aspect of this invention, a pair of layers of different materials are formed on a substructure with one of the materials of the first and second layers on the side of incidence of the radiation being slightly absorbing and the other being free of absorption. The optical thickness of the first layer is either less or more than one quarter of the design wavelength of the mirror depending on which of the first and second layers is absorbing. The optical thickness of the layers are chosen such that the overall reflectance of the mirror is substantially maximized at a value greater than the reflectance of a multilayer mirror in which the corresponding layers each are quarterwave layers. In the case that both materials are absorbing with indices expressed as $n_1 - ik_1$ and $n_2 - ik_2$ the optical thickness of the first layer is either more or less than one quarter of the design wavelength depending on whether the value of $k_2/n_2$ is more or less than the value of $k_1/n_1$.

In accordance with another aspect of this invention, a multilayer reflector is provided in which at least the first two of the pairs of layers on the side of incidence of the radiation have optical thicknesses of the respective layers which are all different from each other and also different from one quarter of the design wavelength. More specifically, in accordance with this invention, a multilayer mirror for reflecting radiation at a preselected wavelength comprises a substrate and a plurality of pairs of layers of alternate low and high refractive index materials formed on the substrate with the respective complex refractive indices of the materials expressed as $n_2 - ik_2$ and $n_1 - ik_1$, where $n_1$ and $n_2$ are the real components, and $k_1$ and $k_2$ are the extinction coefficients, at least one of which has a non-negligible value. As previously mentioned, at least the first two of these pairs of layers on the side of incidence of the radiation have optical thicknesses which are different from each other and different from one quarter of the preselected wavelength with the respective optical thicknesses of the layers of low and high refractive index materials being either less and more or more and less than one quarter of the preselected wavelength depending upon whether the value of $k_2/n_2$ is more or less than the value of $k_1/n_1$ and with the actual values of the respective optical thicknesses being chosen such that the reflectance of the mirror is substantially maximized.

In accordance with another aspect of this invention substantially all of the pairs of layers of the multilayer mirror have optical thicknesses of the respective layers which are all different from each other and different from one quarter of the preselected wavelength with the respective optical thicknesses of the layers of low and high refractive index materials in each pair being either lesser or greater or greater and lesser than one quarter of the preselected wavelength depending upon whether the value of $k_2/n_2$ is greater or lesser than the value of $k_1/n_1$.

This invention has the advantage of being applicable to all types of multilayer mirrors, namely, mirrors in which only one of the low and high refractive index layers is absorbing and mirrors in which both layers are absorbing. A multilayer reflector constructed in accordance with a preferred embodiment of this invention achieves the maximum reflectance which can be achieved with the materials utilized within the fewest number of layers. Utilizing the principles of this invention, each pair of layers added to a multilayer mirror results in a reflectance value which is at least equal to the reflectance value of a QWS reflector and after a sufficient number of layers has been applied exceeds the reflectance value of a QWS reflector.

Compared with a multilayer reflector constructed in accordance with the prior art Lissberger approach, a multilayer reflector in accordance with this invention achieves considerably greater reflectance values throughout the whole range of layers utilized until the number of layers becomes very large. Compared with the multilayer reflector constructed in accordance with the prior art DeBell approach, a multilayer reflector in accordance with this invention also achieves higher reflectance throughout the range of layers utilized until the number of layers becomes exceedingly high. Consequently, a multilayer reflector in accordance with this invention can achieve the same value of increased reflectance over that of a QWS with considerably fewer layers than required in accordance with either of the DeBell or Lissberger approaches. Furthermore, the maximum reflectance which can be achieved by a multilayer mirror in accordance with this invention substantially exceeds the peak reflectance of a QWS which, as previously noted, occurs at a wavelength other than the design wavelength.

Other features and advantages of this invention will be apparent from a consideration of the detailed description below in conjunction with the accompanying drawings.

Figure 3:
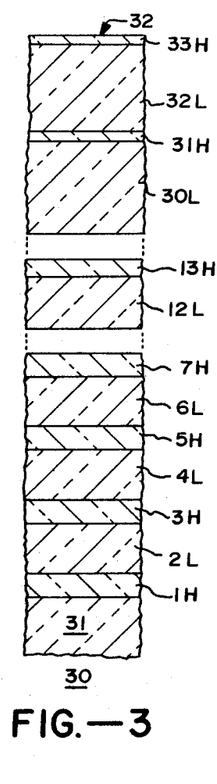
FIG. 3 is a fragmented cross-sectional view of a multilayer mirror constructed in accordance with this invention.

FIG. 3 depicts a multilayer mirror in accordance with this invention. Mirror 30 comprises a multilayer dielectric stack 32 formed of alternate layers of high and low refractive index materials on a glass substrate 31. The particular structure shown in FIG. 3 is for a case in which the high refractive index material is slightly absorbing and the low refractive index material is free of absorption. It can be seen that an essential characteristic of a dielectric stack in accordance with this invention is the non-periodic nature of the thickness of respective layers of low and high refractive index materials. Not only is the optical thickness of the layers of the absorbing high index material less than a quarterwave and that of the non-absorbing low index material greater than a quarterwave, but the optical thicknesses of the layers of high index material and low index material are different from one pair of layers to another. The differences in the thickness of the high and low index materials for the first few layers is relatively small and in particular too small to be depicted in a drawing of this scale. However, it can be seen that the 13th layer which is a high refractive index layer labelled 13H has a thickness substantially less than that of layer 7H. Correspondingly, layers 31H and 33H are substantially thinner than layer 13H. On the other hand, in a dielectric stack in accordance with this invention the layers of low refractive index material, for this case, increase in thickness for each additional layer formed on substrate 31. Thus, layer 12L is substantially thicker than layer 6L and layers 30L and 32L are substantially thicker than layer 12L.

Contrasting the non-periodic dielectric stack in accordance with this invention with the Lissberger stack shown in FIG. 2 and the QWS design in FIG. 1, it is seen that both the Lissberger stack and the QWS stack are periodic. Table I below gives the actual data for the thicknesses of the various layers of low and high refractive index material in a dielectric stack according to this invention (called an "optimum pairs stack") and for a Lissberger stack. The thickness of each layer is expressed as a value normalized to the quarterwave optical thickness. The data is for an example in which the high refractive index material is zinc sulfide (ZnS) for which the complex refractive index is $n_H = 2.35 - i0.001$ and the low refractive index material is cryolite for which the refractive index is $n_2 = 1.35$. Also in this example the substrate is glass with a refractive index of 1.51 and the incident medium is air with a refractive index of 1.0.

TABLE I

| Layer #'s | Optimum Pairs Stack | | Lissberger Stack | |
|---|---|---|---|---|
| | Low | High | Low | High |
| 1 | — | 1.000 | — | 1.000 |
| 2, 3 | 1.001 | 0.999 | 1.6 | 0.574 |
| 4, 5 | 1.003 | 0.998 | " | " |
| 6, 7 | 1.010 | 0.994 | " | " |
| 8, 9 | 1.029 | 0.983 | " | " |
| 10, 11 | 1.081 | 0.953 | " | " |
| 12, 13 | 1.196 | 0.885 | " | " |
| 14, 15 | 1.361 | 0.777 | " | " |
| 16, 17 | 1.504 | 0.665 | " | " |
| 18, 19 | 1.599 | 0.575 | " | " |
| 20, 21 | 1.662 | 0.507 | " | " |
| 22, 23 | 1.705 | 0.456 | " | " |
| 24, 25 | 1.736 | 0.417 | " | " |
| 26, 27 | 1.759 | 0.386 | " | " |
| 28, 29 | 1.778 | 0.360 | " | " |
| 30, 31 | 1.793 | 0.338 | " | " |
| 32, 33 | 1.805 | 0.320 | " | " |

As previously indicated the Lissberger design approach involves picking a thickness for the layer of low refractive index material in terms of the ultimate target reflectance of the multilayer mirror. Other Lissberger designs could be constructed using other thicknesses of the low refractive index material such as 1.4 or 1.2 times a quarterwave, with corresponding different thicknesses for the high refractive index material, such as 0.748 and 0.883 times a quarter wave.

FIG. 4 shows a graph of the performance of an optimum pairs multilayer mirror in accordance with a preferred embodiment of this invention in comparison with the performance of mirrors having a QWS and various Lissberger stacks, each of which is identified on the graph by the normalized optical thickness of the low refractive index material. From the superimposed graphs, it is quite apparent that the performance of the optimum pairs stack in accordance with this invention constitutes a substantial improvement over the QWS and the Lissberger stack in several respects. First, the optimum pairs stack always has a reflectance for each particular value of the number of layers utilized which is equal to or greater than that of the QWS. The reflectance of the optimum pairs stack is also higher than that of the Lissberger stacks for all numbers of layers utilized.

Figure 8:
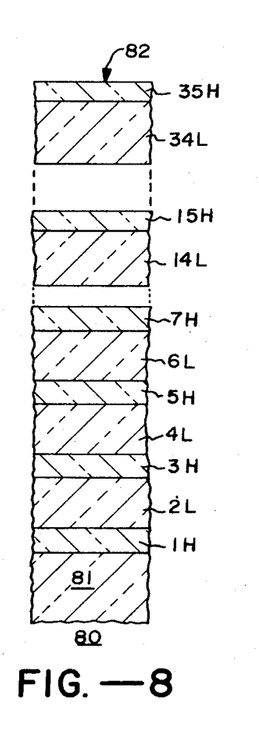
FIG. 8 is a fragmented cross-sectional view of a multilayer mirror constructed in accordance with this invention.

FIG. 8 depicts a second embodiment of a multilayer mirror in accordance with this invention. Mirror 80 comprises a multilayer dielectric stack 82 formed of alternate layers of high and low refractive index materials on a glass substrate 81. Table II below gives the actual data for the thicknesses of the various layers of low and high refractive index material in dielectric stack 82. Table II also gives the same data for a DeBell type stack shown in FIG. 7. The thickness values in each case are expressed in terms of values normalized to the quarterwave optical thickness. The data is for an example in which the high refractive index material and the low refractive index material are both absorbing. In this case the high refractive index material is zinc sulfide and the low refractive index material is silicon dioxide. The complex refractive index of zinc sulfide is $n_H = 2.35 - i0.001$. The complex refractive index of silicon dioxide is $n_L = 1.47 - i0.0001$.

TABLE II

| Layer #'s | Optimum Pairs Stack | | DeBell Stack | |
|---|---|---|---|---|
| | Low | High | Low | High |
| 1 | — | 1.000 | — | 1.000 |
| 2, 3 | 1.001 | 0.999 | 1.429 | 0.741 |
| 4, 5 | 1.002 | 0.998 | " | 0.713 |
| 6, 7 | 1.006 | 0.996 | " | 0.707 |
| 8, 9 | 1.015 | 0.991 | " | 0.706 |
| 10, 11 | 1.036 | 0.977 | " | 0.705 |
| 12, 13 | 1.082 | 0.949 | " | " |
| 14, 15 | 1.159 | 0.899 | " | " |
| 16, 17 | 1.252 | 0.838 | " | " |
| 18, 19 | 1.326 | 0.784 | " | " |
| 20, 21 | 1.374 | 0.749 | " | " |
| 22, 23 | 1.400 | 0.728 | " | " |
| 24, 25 | 1.414 | 0.717 | " | " |
| 26, 27 | 1.421 | 0.711 | " | " |
| 28, 29 | 1.425 | 0.708 | " | " |
| 30, 31 | 1.427 | 0.707 | " | " |
| 32, 33 | 1.428 | 0.706 | " | " |
| 34, 35 | 1.429 | 0.705 | " | " |

FIGS. 7 and 8 together with Table II enable a meaningful comparison between the physical structure of optimum pairs stack 82 and a DeBell stack 72. Except for the first high refractive index layer 1H in each stack, which preferably has a quarterwave optical thickness on a glass substrate, it is seen that all of the low refractive index layers in optical pairs stack 82 are thicker than a quarterwave optical thickness, but all of the low index layers have different thicknesses. In contrast in the DeBell stack 72 all of the low index layers have the same thickness although each is thicker than a quarterwave optical thickness. All of the high refractive index layers in optical pairs stack 82 are less than a quarterwave optical thickness and are different from each other. In DeBell stack 72 the first few layers of high refractive index material have different optical thicknesses but thereafter the optical thickness remains the same.

As will later be demonstrated in detail, the design principle in accordance with this invention establishes which of the layers of high and low refractive index material will be less than a quarterwave optical thickness depending on which material has the lowest ratio of extinction coefficient to real component of the coplex refractive index. In this case, the ratio for zinc sulfide (0.001/2.35) is greater than the ratio for silicon dioxide (0.0001/1.47). Consequently, the zinc sulfide layers are less than a quarterwave optical thickness and the silicon dioxide layers are greater than a quarterwave optical thickness.

FIG. 9 shows superimposed graphs of the performance of the optimum pairs multilayer mirror in this case compared with the performance of QWS mirror and a mirror with a DeBell stack. As clearly demonstrated by these superimposed graphs, the reflectance of the optimized pairs stack is always equal to or greater than that of a QWS. In contrast the reflectance of a DeBell stack is less than that of a QWS until a substantial number of layers has been formed. The optimized pairs stack has a higher reflectance value than a DeBell stack over most of the range of layers until a very high value for the number of layers is reached, when the reflectance values for the optimized pairs stack and the DeBell stack both achieve the same saturation level.

If the absorptance of the DeBell stack and the optimized pairs stack were compared, however, it would be seen that the DeBell stack has lower absorptance throughout the low range of layer numbers than does the optimized pair stack. The optimized pair stack at higher numbers of layers has an absorptance which is exactly the same as the DeBell stack. Compared with a QWS, the absorptance of the optimum pairs stack is always equal to or less than the QWS.

Table III below gives the layer thickness data for a multilayer mirror with an optimum pairs stack utilizing materials suitable for carbon dioxide laser reflector at a design wavelength of 10.6 microns as discussed in an article by A. D. Baer entitled "Design of Three-Layer Antireflectance Coatings," NBS Spec. Pub. 462, p. 221 (1976). The materials in this example are thorium fluoride and arsenic trisulfide. The complex refractive index of thorium fluoride is $n_L = 1.35 - i0.000843$. The complex refractive index for arsenic trisulfide is $n_H = 2.37 - i0.000143$. The substrate material has an index of refraction 1.50.

TABLE III

| Layer #'s | Low | High |
|---|---|---|
| 1 | | 1.000 |
| 2, 3 | 0.999 | 1.001 |
| 4, 5 | 0.996 | 1.003 |
| 6, 7 | 0.987 | 1.008 |
| 8, 9 | 0.961 | 1.022 |

TABLE III-continued

| Layer #'s | Low | High |
|---|---|---|
| 10, 11 | 0.903 | 1.056 |
| 12, 13 | 0.802 | 1.115 |
| 14, 15 | 0.691 | 1.186 |
| 16, 17 | 0.606 | 1.246 |
| 18, 19 | 0.554 | 1.285 |
| 20, 21 | 0.526 | 1.307 |

It will be noted that in this case, the value of $k_2/n_2$ is more than the value of $k_1/n_1$. Consequently, in accordance with the design principles of this invention, the layers of high refractive index material are of a thickness greater than a quarterwave optical thickness and the layers of low refractive index material are less than a quarterwave optical thickness. The thicknesses of the high refractive index material increase with layer number whereas the thicknesses of the low refractive index material decrease with layer number. If one were to compare the performance of the optimum pairs stack according to the data given in Table III with that of a quarterwave stack an improved reflectance at higher layer numbers would be seen.

Figure 5:
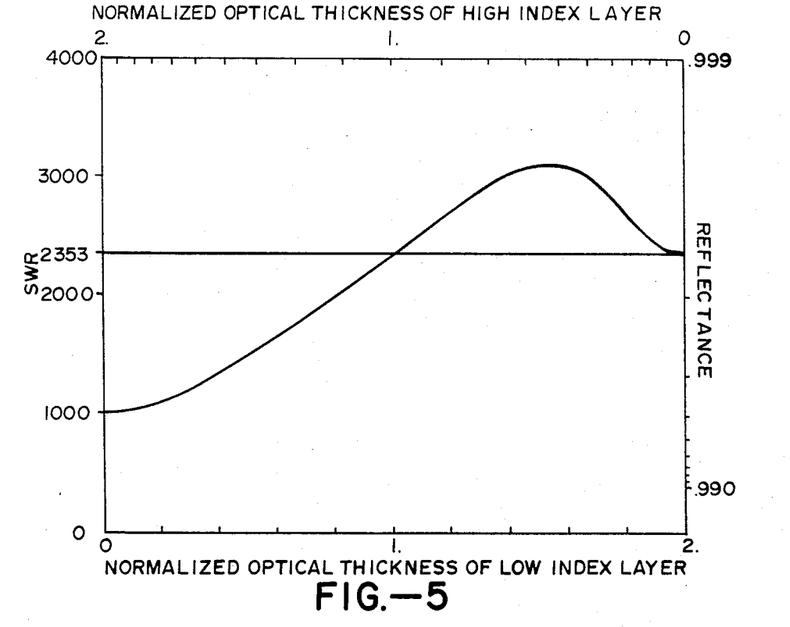
FIG. 5 is a graph useful in explaining the principles of this invention.
Figure 6:
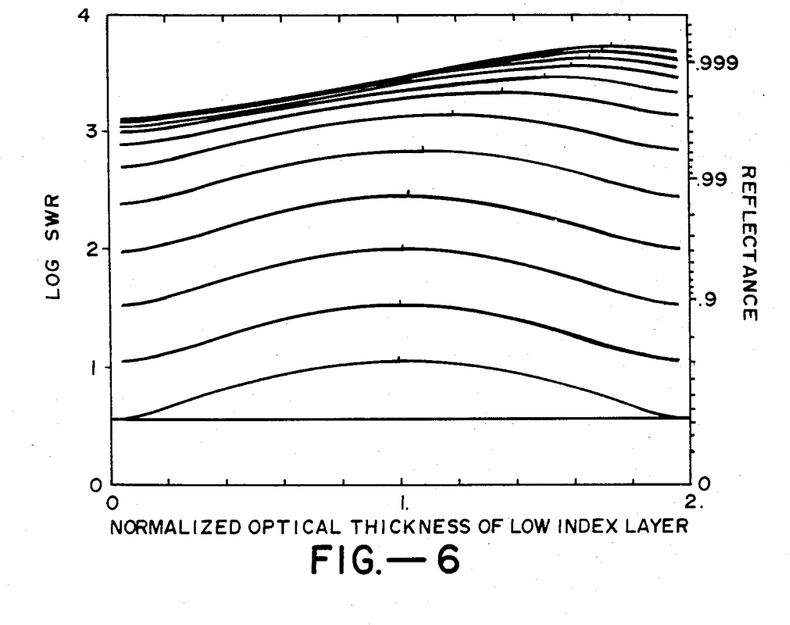
FIG. 6 is a graph useful in explaining the principles of this invention.

The concept of an optimum pair of layers in accordance with this invention can be understood from a consideration of the absorbing QWS shown in FIG. 1 and the graph of FIG. 4 together with the graphs of FIGS. 5 and 6. It can be seen in FIG. 4 that the Kopplemann limit of the reflectance of a QWS is reached after about 21 layers of material have been formed. Thereafter, the effect of adding another pair of high and low index layers of a quarterwave optical thickness is negligible. However, if the thickness of the layers is not constrained to be equal to a quarterwave optical thickness then the Koppleman limit can be exceeded. The optimum thicknesses for an added pair of layers can be found by adding a low index and a high index layer to the twenty one layer QWS and letting the optical thicknesses of these two layers each range separately over values between zero and two quarterwaves. The optimum pair of such layers is defined as the combination of respective thicknesses of the low and high refractive index layers resulting in the highest additional reflectance.

A mathematical approach to finding the optimum pair would involve maximizing a function of two variables. Because of the complexity of the reflectance equations of thin films, a two dimensional optimization is difficult to handle from a theoretical standpoint. Using a computer and a trial and error approach is also time consuming. However, it has been discovered that a great simplification results if the following design principle is invoked: when a slightly absorbing high index layer is added to a substructure having an arbitrary (complex) amplitude reflectance, the maximum reflectance results when the thickness of the high index layer is chosen to given an amplitude reflectance which is negative and real. The principle is known for non-absorbing coating materials and can be applied to materials having slight absorption.

By requiring that the final amplitude reflectance be negative and real, the problem of finding the optimum pair is reduced to a one dimensional optimization. The procedure for finding the solution is still a trial and error procedure but is simplified in that for each value of the thickness of the low index layer, the thickness of the high index layer is uniquely determined by the requirement that the final reflectance be real.

FIG. 5 illustrates this trial and error procedure as it applied to a twenty one layer QWS of the type whose optical performance is shown in FIG. 4. The horizontal line at the value of SWR=2355 indicates the maximum reflectance value achieved by the QWS. The curved line represents the resulting SWR after the addition of a low index layer and a high index layer which satisfies the design principle given previously. The SWR is plotted against the optical thickness of the low index layer in quarterwaves. The scale across the top indicates the corresponding optical thickness of the high index layer and illustrates that the thickness of the high index layer is uniquely determined from the low index layer by the requirement that the final reflectance be real. However, in general, the sum of the optical thicknesses of the two layers does not equal two quarterwaves.

From FIG. 5 it can be seen that the optimum increase in reflectance results when a low refractive index layer of thickness equal to 1.53 quarterwave optical thicknesses and a high refractive index layer with a thickness equal to 0.64 quarterwave optical thicknesses is added to the stack. This pair of layers with these thicknesses constitutes the optimum pair in this case. The addition of this optimum pair increases the SWR from 2355 to 3086 and the corresponding reflectance from 0.9983 to 0.9987.

A second optimum pair could be added to the first in the above example to further increase the reflectance. The approach to finding the appropriate thicknesses for the second optimum pair would be precisely the same as that for finding the thicknesses for the first optimum pair. One would start with the standing wave ratio of the first optimum pair and allow the normalized optical thicknesses of the low index layer to range between zero and two quarterwaves, each time determining the optical thickness of a high index layer which would make the overall amplitude reflectance negative and real. Alternatively, a design approach can be taken wherein optimum pairs are utilized for all or substantially all of the layer pairs in the multilayer mirror design. The reflectance maximization procedure illustrated in FIG. 5 and discussed above, would be repeated for every pair of layers of the dielectric stack. It can thus be seen that there are two approaches to an optimum pairs stack in accordance with this invention: (1) using optimum pairs in all layers of the stack (as in the examples given above in Tables I, II, and III); and (2) using quarterwave layers for the initial layers and switching to optimum pairs at a point where they contribute to improved reflectance.

FIG. 6 shows graphically the results of the first approach which was used to produce the optimum pairs stack of Table I. The horizontal line at the bottom of the graph represents the logarithm of the standing wave ratio (Log SWR) of the substrate with the first quarterwave high index layer formed thereon. The next curve is the SWR after the addition of the first pair of layers. In this case, the optimum pair is very nearly a pair of quarterwaves, as can be seen from Table I. For each additional pair of layers the starting SWR is taken to be the maximum from the previous curve (indicated by a tic mark on each curve). The upper scale giving the optical thickness of the high index layer is omitted from this graph because its value depends on the starting value of the SWR and is thus different for each curve.

While FIG. 6 illustrates graphically the basic principles involved in the optimum pairs design approach for high reflectivity mirrors, to be an easily usable technique, explicit expressions for the layer thicknesses for the optimum pair are desirable. The derivations of such expressions for the layer thicknesses of an optimum pair will now be demonstrated together with a design example.

Figure 12:
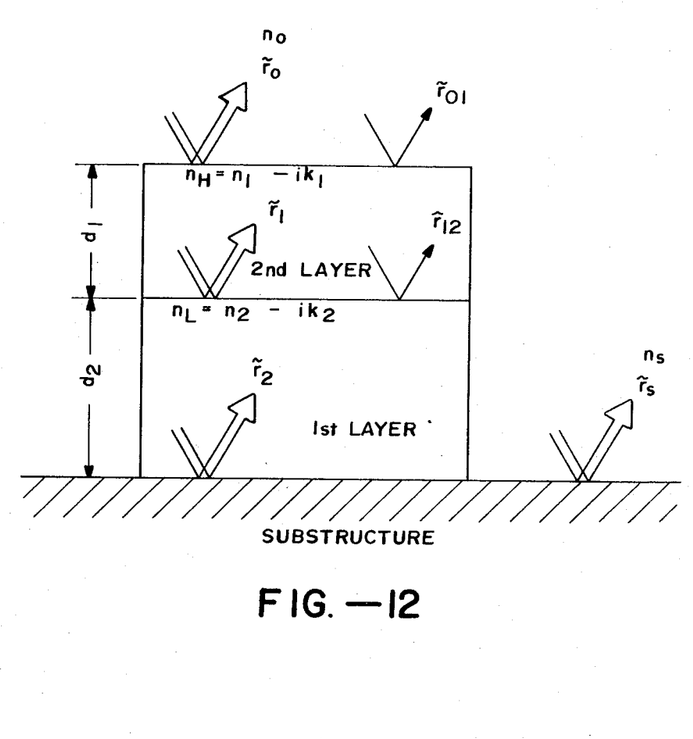
FIG. 12 is a drawing useful in explaining the theoretical derivation of the principles of this invention.

Consider a substructure surrounded by an incident medium with refractive index $n_o$. Here substructure refers to a flat dielectric or metal substrate, or any thin film system on such a substrate. The substructure is characterized sufficiently by its complex amplitude reflectance $$\tilde{r}_s = r_s e^{-i\delta_s}, \tag{1}$$

where $r_s$ and $\delta_s$ are respectively the amplitude and phase of $\tilde{r}_s$. FIG. 12 illustrates the substructure together with two slightly absorbing dielectric layers added to its surface. The subscript 1 is used to denote quantities associated with the outer layer, which is assumed to have the higher refractive index. It is also assumed that the higher refractive index is greater than that of the incident medium. The parameters for the low index layer are denoted by subscript 2. The complex refractive index for the j-th layer is $n_j - ik_j$. The condition of weak absorption implies that $K_j/n_j << 1$. The Fresnel reflection coefficient between materials i and j (indicated by a single arrow in FIG. 12) is defined by $$\tilde{r}_{ij} = \frac{(n_i - ik_i) - (n_j - ik_j)}{(n_i - ik_i) + (n_j - ik_j)} \quad i,j = 0,1,2. \tag{2}$$

The amplitude reflectances $$\tilde{r}_j = r_j e^{-i\delta_j} \quad j = 0,1,2, \tag{3}$$

denoted by double arrows in FIG. 12, are the reflectances occuring in the j-th medium for the entire system below that medium. For example, $\tilde{r}_2$ is the reflectance of the substructure as seen from inside the low index (j=2) layer. It is related to the reflectance $\tilde{r}_s$ of the uncoated substructure by $$\tilde{r}_2 = (\tilde{r}_{20} + \tilde{r}_s)/(1 + \tilde{r}_{20}\tilde{r}_s), \tag{4}$$

where $\tilde{r}_{20}$ is the Fresnel coefficient between the low index material and the incident medium as defined in Equation (2).

The phase thickness $\phi_j$ of each layer is $$\phi_j = (2\pi/\lambda_o)n_j d_j \quad j = 1,2, \tag{5}$$

where $d_j$ is the physical thickness of the layer and $\lambda_o$ is the design wavelength as measured in vacuum. Similarly, the single pass attenuation coefficient $\alpha_j$ of each layer is $$\alpha_j = (2\pi/\lambda_o)k_j d_j = (k_j/n_j)\phi_j \quad j = 1,2. \tag{6}$$

Now for $i = 0,1$ and $j = i+1$, it can be shown that $$\tilde{r}_i = \frac{\tilde{r}_{ij} + \tilde{r}_j e^{-2\alpha_j} e^{-i2\phi_j}}{1 + \tilde{r}_{ij}\tilde{r}_j e^{-2\alpha_j} e^{-i2\phi_j}}. \tag{7}$$

With the above notation, the fundamental question addressed by this invention can be stated as follows: Given an arbitrary substructure with reflectance $\tilde{r}_s$, overcoated with two layers as shown in FIG. 12, what values of phase thickness $\phi_1$ and $\phi_2$ yield the maximum final reflectance $r_o$? This pair of layers is defined to be the optimum pair. In general the optimum values of $\phi_1$ and $\phi_2$ depend on $\tilde{r}_s$, $n_j$, and $k_j$.

Because of the complexity of the above equations, it is only possible to answer this question analytically through terms of first order in $k_j/n_j$. Terms of order $(k_j/n_j)^2$ and higher are negligible for weakly absorbing dielectric materials and can be ignored. To this approximation, the Fresnel reflectance can be written in the form $$\tilde{r}_{ij} \approx r_{ij} e^{-\delta_{ij}}, \tag{8}$$

where $$r_{ij} \equiv (n_i - n_j)/(n_i + n_j) \tag{9}$$

is the real Fresnel coefficient in the absence of absorption. Note the $r_{ij}$ may be positive or negative, depending on whether $n_1$ is larger than $n_j$ or not. The phase $\delta_{ij}$ consistent with Equation (8) and (9) expressed to first order in $k_j/n_j$, is $$\delta_{ij} \approx \left(\frac{k_i}{n_i} - \frac{k_j}{n_j}\right) \frac{1 - r_{ij}^2}{2r_{ij}}. \tag{10}$$

Before proceeding with the optimization of $r_o$, it is useful to determine the phases $\delta_o$ and $\delta_1$ of $\tilde{r}_o$ and $\tilde{r}_1$ in terms of the other parameters of the system. This can be done in general by using Equation (7), which can be rewritten in the form $$r_i e^{-i\delta_i} = \frac{r_{ij} e^{-i\delta_{ij}} + r_j e^{-2\alpha_j} e^{-i(\delta_j + 2\phi_j)}}{1 + r_{ij} e^{-i\delta_{ij}} r_j e^{-2\alpha_j} e^{-i(\delta_j + 2\phi_j)}}. \tag{11}$$

From this it follows that $$\frac{r_{ij}(1 - r_j^2 e^{-4\alpha_j})\sin\delta_{ij} + r_j e^{-2\alpha_j}(1 - r_{ij}^2)\sin(\delta_j + 2\phi_j)}{r_{ij}(1 + r_j^2 e^{-4\alpha_j})\cos\delta_{ij} + r_j e^{-2\alpha_j}(1 + r_{ij}^2)\cos(\delta_j + 2\phi_j)}. \tag{12}$$

The maximization of $r_o$ with respect to $\phi_1$ and $\phi_2$ can be simplified by the condition that $\tilde{r}_o$ be real and negative, as previously mentioned. With this condition the problem of finding the optimum pair reduces to determining the value of $\phi_2$ for the low index layer such that $$dr_o/d\phi_2 = 0. \tag{13}$$

The relationship between $\phi_1$ and $\phi_2$ necessary to give a negative real value to $\tilde{r}_o$ is found by letting $\delta_o = \pi$ or tan $\delta_o = 0$ in Equation (12). The result is $$0 = r_{01}(1 - r_1^2 e^{-4\alpha_1})\sin\delta_0 \tag{14}$$
$$+ r_1 e^{-2\alpha_1}(1 - r_{01}^2)\sin(\delta_1 + 2\phi_1).$$

The leading term on the right hand side is of order $k_1/n_1$ resulting from the factor $\sin\delta_{01}$. In addition, however, the factor in parentheses becomes small as $r_1$ approaches unity. In this case the leading term can be neglected, and the condition for $\delta_o = \pi$ becomes $$\phi_1 \simeq \tfrac{1}{2}(\pi - \delta_1). \tag{15}$$

To the same degree of approximation, $\delta_1$ may be expressed as $$\tan\delta_1 \simeq \frac{r_2 e^{-2\alpha_2}(1 - r_{12}^2)\sin(\delta_2 + 2\phi_2)}{r_{12}(1 + r_2^2 e^{-2\alpha_2}) + r_2 e^{-2\alpha_2}(1 + r_{12}^2)\cos(\delta_2 + 2\phi_2)}. \tag{16}$$

If the high index layer is non-absorbing, then $\delta_{01}=0$ and the above two equations become exact.

Equations (15) and (16) are a fundamental part of the solution to finding the optimum pair. Note that $\delta_1$ and thus $\phi_1$ depend not only on the refractive indices of the materials (through $r_{12}$ and $\alpha_2$) and the phase thickness $\phi_2$, but also on the substrate reflectance $r_2$. Note further that even if $\delta_2 = -\pi$ as it likely would for a dielectric substructure, it is not generally true that $\phi_1 + \phi_2 = \pi$, corresponding to a combined optical thickness equal to a halfwave. This only happens when $\phi_1 = \phi_2 = \pi/2$ (both layers of QWOT) or when $\phi_1$ or $\phi_2 = 0$.

The condition imposed by Equation (15) reduces $\tilde{r}_o$ to $$\tilde{r}_o = -r_o = \frac{r_{01} - r_1 e^{-2\alpha_1}}{1 - r_{01}r_1 e^{-2\alpha_1}}, \tag{17}$$

where the effects of the phase $\delta_{01}$ are second order and have been neglected. Taking the derivative of Equation (17) and setting it to zero according to Equation (13), one obtains, after some algebra, the condition for maximum reflectance that $$\frac{1}{r_1}\frac{dr_1}{d\phi_2} = 2\frac{k_1}{n_1}\frac{d\phi_1}{d\phi_2}. \tag{18}$$

To take advantage of this result, it is necessary to evaluate $d\tilde{r}_1/d\phi_2$. From Equation (3), it can be shown that $$\frac{1}{\tilde{r}_1}\frac{d\tilde{r}_1}{d\phi_2} = \frac{1}{r_1}\frac{dr_1}{d\phi_2} - i\frac{d\delta_1}{d\phi_2}. \tag{19}$$

With the help of Equations (15) and (18), this reduces to $$\frac{1}{\tilde{r}_1}\frac{d\tilde{r}_1}{d\phi_2} = 2i(1 - ik_1/n_1)\frac{d\phi_1}{d\phi_2}. \tag{20}$$

Evaluating the left hand side using Equation (7) gives $$\frac{1}{\tilde{r}_1}\frac{d\tilde{r}_1}{d\phi_2} = \frac{-2i(1 - ik_2/n_2)\tilde{r}_2(1 - \tilde{r}_{12}^2)e^{-2\alpha_2}e^{-i2\phi_2}}{(1 + \tilde{r}_{12}\tilde{r}_2 e^{-2\alpha_2}e^{-i2\phi_2})(\tilde{r}_{12} + \tilde{r}_2 e^{-2\alpha_2}e^{-i2\phi_2})}. \tag{21}$$

The right hand sides of the above two expressions can be equated, leading to $$-r_2 e^{-2\alpha_2}(1 - \tilde{r}_{12}^2)(1 - ik_2/n_2)/(1 - ik_1/n_1) = \tag{22}$$
$$[\tilde{r}_{12}(e^{i(\delta_2 + 2\phi_2)} + r_2^2 e^{-4\alpha_2}e^{-i(\delta_2 + 2\phi_2)})$$
$$+ r_2 e^{-2\alpha_2}(1 + \tilde{r}_{12}^2)]d\phi_1/d\phi_2.$$

Multiplying both sides of Equation (22) by $e^{i\delta_{12}}$ and determining the phase angle of each side, one finds to first order in $k/n$ $$\delta_{12}(1 + r_{12})^2/(1 - r_{12}^2) \simeq \tag{23}$$
$$\frac{r_2(1 - r_{12}^2)\delta_{12} + r_{12}(1 - r_2^2 e^{-4\alpha_2})\sin(\delta_2 + 2\phi_2)}{r_2(1 + r_{12}^2) + r_{12}(1 + r_2^2)\cos(\delta_2 + 2\phi_2)},$$

where the fact that $d\phi_1/d\phi_2$ is negative has been used to put the right hand side in the correct quadrant.

Equation (23) can be simplified by using Equations (9) and (10), and by defining $$a = 4n_1^2 r_2[(k_1/n_1) - (k_2/n_2)], \tag{24a}$$

$$b = a(1 + r_2^2)/2r_2, \tag{24b}$$

$$c = (n_1^2 - n_2^2)(1 - r_2^2 e^{-4\alpha_2}). \tag{24c}$$

and the angles $$\sin\beta = a/(b^2 + c^2)^{\frac{1}{2}}, \tag{25a}$$

and $$\tan\gamma = b/c \tag{25b}$$

This leads to the solution $$\phi_2 = \tfrac{1}{2}(\beta + \gamma - \delta_2). \tag{26}$$

The range for $\beta$ and $\gamma$ is from $-\pi/2$ to $\pi/2$. Unfortunately Equation (26) is not a direct solution for $\phi_2$ since $\beta$ and $\gamma$ are both determined from Equation (24c) which contains $\phi_2$ in the exponential term. However, Equations (24) to (26) can be solved using an iterative technique to solve for a self-consistent value of $\phi_2$.

An example will be given to illustrate this design procedure for a reflector utilizing an optimum pairs stack. The example will be of an enhanced metal reflector commonly used in infrared laser work as reported in an article by M. Braunstein et al., entitled Multilayer Enhanced Dielectric Mirrors for 10.6 μm, Proc. 5th Conf. on Infrared Laser Window Materials, December 1975, p434. Most metals have a high reflectance for radiation in the infrared region. This reflectance can be further increased by the addition of a few pairs of dielectric layers. For this example, we will use silver as a substrate material and zinc selenide and thorium fluoride as the coating materials. The design wavelength will be $\lambda_o = 10.6$ microns. The silver substrate has a complex refractive index given by $n_s = 8 - i75$ at this wavelength.

Accordingly, the uncoated silver substrate has a value of $r_s = 0.99719$ and a value of $\delta_s = -3.115$ radians. The complex refractive index of zinc selenide is $n_H = 2.41 - i0.00005$. The complex refractive index for thorium fluoride is given by $n_L = 1.35 - i0.0005$.

The reflectance of the substrate inside the first (low index) layer is $r_2 = 0.99620$ and $\delta_2 = -3.106$ radians, as calculated in accordance with Equation (4). The phase thickness $\phi_2$ of the low index layer is determined using Equations (24)–(26). The corresponding value of $\phi_1$ for the high index layer is calculated from Equations (15)–(16). Then the resulting reflectance $r_o$ may be calculated using Equation (7). To add a second optimum pair of layers, this value of $r_o$ is used as the new value of $r_s$ and the above procedure is reiterated. For each additional set of optimum pairs the above procedure is repeated. It will be noted that for the second and all succeeding optimum pairs, $\delta_2 = \delta_s = -\pi$ since the reflectance after each pair is negative and real as dictated by the design principle previously given.

Complete design data for the formation of seven optimum pairs (i.e. fourteen layers) of zinc selenide and thorium fluoride on a silver substrate is given in Table IV.

TABLE IV

| Layer #'s | Optimum Pairs Stack | | QWS | |
|---|---|---|---|---|
| | Low | High | Low | High |
| 1, 2 | 0.856 | 1.075 | 0.989 | 1.000 |
| 3, 4 | 0.746 | 1.148 | 1.000 | " |
| 5, 6 | 0.625 | 1.228 | " | " |
| 7, 8 | 0.539 | 1.293 | " | " |
| 9, 10 | 0.485 | 1.339 | " | " |
| 11, 12 | 0.455 | 1.365 | " | " |
| 13, 14 | 0.437 | 1.382 | " | " |
| — | — | — | " | " |
| 25, 26 | 0.416 | 1.402 | " | " |

As in previous examples, the layer thicknesses are normalized to a quarterwave optical thickness. These normalized values can be easily obtained from the phase thicknesses $\phi_1$ and $\phi_2$ for each layer by dividing the values by $\pi/2$. The design for a corresponding QWS reflector is also shown in Table IV. This design starts with a low refractive index layer equal to 0.989 of a quarterwave optical thickness to compensate for the value of $\delta_2$ for the silver substrate, i.e. to compensate for the phase shift in the amplitude reflectance from the silver substrate. This layer is then followed by layers of quarterwave optical thicknesses of the two materials. It will be seen in contrasting the optimum pairs design with the QWS design that the layer thicknesses of the optimum pairs design are different for each pair.

In this instance it will also be seen that the value of $k_1/n_1$ is less than the value of $k_2/n_2$ which, according to the principles of this invention, results in the low refractive index material having thicknesses less than a quarterwave optical thickness and the high refractive index layers having a thickness greater than a quarterwave optical thickness. The thicknesses of the low index layers are all different, decreasing as more layers are added until a limiting value of 0.416 quarterwaves is reached after about 13 pairs. The high refractive index layers are also of different thicknesses, showing an increase in thickness as more layers are added. As previously mentioned, the total thickness of each pair is not two quarterwaves, even though the phase of the amplitude reflectance after each pair is added changes by $2\pi$ radians or 360°.

Figure 10:
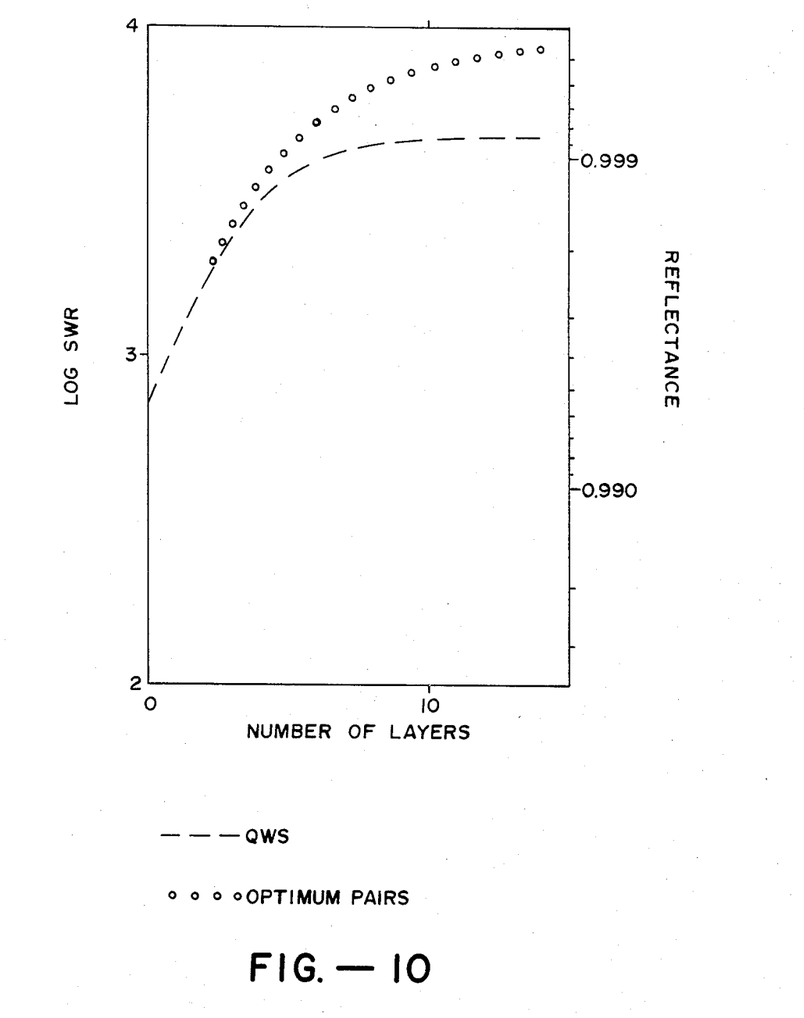
FIG. 10 is a graph which shows comparative optical performances of a multilayer reflector constructed in accordance with this invention and a prior art quarterwave stack design.
Figure 11:
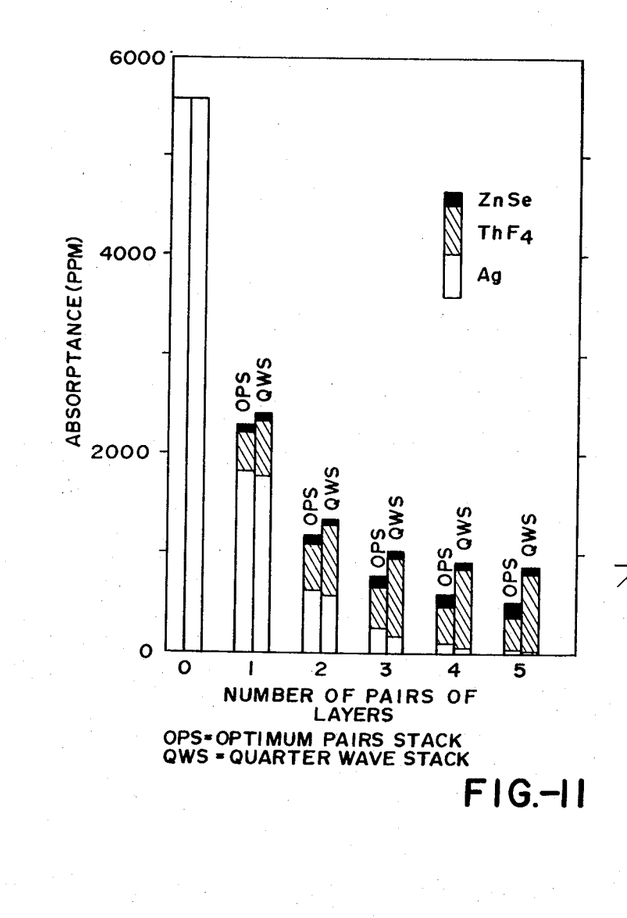
FIG. 11 is a bar graph useful in comparing the performance of a multilayer mirror in accordance with this invention with a prior art multilayer mirror utilizing a quarterwave stack.

FIG. 10 is a graph of the log of the SWR and the reflectance versus the number of layers added for the two designs shown in Table IV. The curve for the QWS shows that the QWS saturates at a reflectance of 0.99913 after about four pairs of layers have been formed. The graph for the optimum pairs stack shows that the use of three optimum pairs leads to a reflectance value greater than the maximum that can be obtained with a QWS design. The increase in the reflectance limit equal to 0.0004 may seem a small improvement. However, when considered in terms of absorbed power, it becomes more significant. The use of optimum pairs decreases the total absorptance to 440 parts per million (ppm) from 870 ppm for the QWS design, a 50% decrease. The advantage of using an optimum pairs design for a high power laser mirror may be even greater than the above reduction in absorption would seem to indicate. This can be seen from a consideration of the distribution of the absorbed energy within the multilayer mirror. FIG. 11 is a bar graph which contrasts the absorptance of energy in the various materials of multilayer mirrors using a QWS and an optimized pairs stack. In each instance, the bar indicates the total energy absorbed in all of the layers of that particular material in the particular design.

FIG. 11 shows that, in a QWS mirror the majority of the absorbed energy is deposited in the thorium fluoride layers after two or more quarterwave pairs are utilized and the amount of energy reaching the substrate rapidly decreases. In high powered laser applications, this type of mirror relies on cooling of the highly conductive metal substrate for continuous operation of the laser. Accordingly, if too many dielectric layers are added in a QWS mirror, the problem of cooling becomes more acute, since most of the heat is deposited in the dielectric multilayer which has thermal conductivity much poorer than the substrate.

Considering the optimized pair stack, it can be seen that the overall absorption is lower than for the QWS design. In addition a larger fraction of the absorbed energy is deposited in the silver substrate which should result in improved thermal characteristics for the mirror. This design example illustrates one of the basic features of the optimum pairs design technique in the most general case where both coating materials are absorbing. It can be seen that the optimum pair stack uses thinner layers of the more absorbing material and thicker layers of the less absorbing material. Mathematically, this results from the factor of $(k_1/n_1 - k_2/n_2)$ in Equation (24a) which determines the sign of both $\beta$ and $\gamma$. Thus, if the value of $k_2/n_2$ is greater than the value of $k_1/n_1$, as in the above example, this factor in Equation (24a) is negative and so are $\beta$ and $\gamma$. This results in a phase thickness $\phi_2$ less than $\pi/2$ according to Equation (26), and thus results in low refractive index layers having a thickness less than a quarterwave optical thickness. It should be noted that for the unusual, special case that $k_1/n_1 = k_2/n_2$, then $\beta$ and $\gamma$ are both zero and the QWS design is the optimum design. On the other hand, the greater the difference in $k_1/n_1$ and $k_2/n_2$, the greater the differences in the layer thicknesses from a quarterwave optical thickness, and the greater the improvement in reflectance which can be achieved using the optimized pairs stack.

Multilayer mirrors in accordance with the principles of this invention may be produced using equipment and techniques well known in the optical coating art. Descriptions of these techniques are found in the following references:

(1) Heavens, O.S., *Optical Properties of Thin Solid Films*, Butterworths Scientific Publications, Ltd., London 1955; and (2) Macleod, H.A., *Thin Film Optical Filters*, American Elsevier Publishing Co., Inc., New York 1969.

Generally, the present state of the art of optical coating enables thin film layers of the type required in this invention to be produced with tolerances in the coating thicknesses of one-percent or less. This degree of accuracy in forming thin film layers is sufficient to enable multilayer mirrors with optimum pairs stacks to be produced and the advantages of increased reflectance to be achieved in practice.

This invention may usefully be employed in high reflectance mirrors designed for wavelengths in the ultraviolet and infrared portions of the spectrum. Absorption levels in most coating materials utilized in reflectors for ultraviolet radiation are high enough that optimum pairs stacks in accordance with this invention offer significant improvements in reflectance. In addition to increasing the reflectance limit, the optimum pairs design requires fewer layers and thus reduces scattering which is a problem in ultraviolet reflectors.

Although k/n values for materials used in high energy laser mirrors for the infrared region tend to be small and scattering is not a major problem, the optimum pairs approach of this invention is beneficial for two reasons. First, an optimum pairs stack with a few pairs of layers can significantly increase the reflectance of an infrared reflector which utilizes a high reflectance metal layer or substrate over that attainable with a QWS. Second, the optimum pairs stack has less absorption than a QWS, which reduces the heating and possibility of damage of the mirror in high energy applications.

It is believed that the use of an optimized pairs stack will lead to a multilayer mirror in each instance which has an optimized reflectance in terms of the materials being utilized and the number of layers involved. However, while certain exemplary embodiments of optimized pairs stacks in accordance with this invention have been described above, it should be understood that numerous modifications could be made without departing from the scope of this invention.

What is claimed is:

1. A multilayer mirror for reflecting radiation at a preselected wavelength comprising a substructure having a relatively high reflectance value and a pair of layers of different dielectric materials formed on said substructure to provide an increased reflectance value, one of the materials of the first and second of said layers on the side of incidence of said radiation being slightly absorbing and the other being free of absorption, the optical thickness of said first layer being less then one quarter of said preselected wavelength if said first layer is slightly absorbing or being more than one quarter of said preselected wavelength if said second layer is absorbing, the optical thicknesses of said first and second layers having first and second values chosen such that the overall reflectance of said mirror is substantially maximized at a value greater than the reflectance of a multilayer mirror in which the first two layers on the side of incidence of said radiation are formed on a substantially identical substructure and optical thickness values differing from said first and second values.

2. A multilayer mirror for reflecting radiation at a preselected wavelength comprising a substructure having a relatively high reflectance value and alternate layers of two dielectric materials of different refractive indices formed in pairs on said substructure to provide an increased reflectance value, one of said materials being more absorbing than the other, the optical thicknesses of the layers in each pair having first and second values, different for each pair, which substantially maximize the overall reflectance of said mirror at a value greater than the reflectance of a multilayer mirror in which the layer pairs are formed on a substantially identical substructure but have optical thickness values differing from said first and second values.

3. A multilayer mirror for reflecting radiation at a preselected wavelength comprising a substructure and a plurality of pairs of layers of alternating low and high refractive index dielectric materials formed on said substructure and having complex refractive indices expressed as $n_2 - ik_2$ and $n_1 - ik_1$, where $n_1$ and $n_2$ are the real components, and $k_1$ and $k_2$ are the extinction coefficients, and $k_1/n_1$ and $k_2/n_2$ have different values, at least the first two pairs of layers on the side of incidence of said radiation having optical thicknesses of the respective layers which are all different from each other and different from one quarter of said preselected wavelength with the optical thicknesses of said layers of low and high refractive index materials being less and more, respectively, than one quarter of said preselected wavelength if $k_2/n_2$ is larger than $k_1/n_1$ or more and less, respectively, than one quarter of said preselected wavelength if $k_2/n_2$ is smaller than $k_2/n_1$ with the actual values of said respective optical thicknesses being chosen such that the overall reflectance of said mirror is substantially maximized.

4. A multilayer mirror as claimed in claim 3, wherein substantially all other pairs of layers have optical thicknesses of the respective layers which are all different from each other and different from one quarter of said preselected wavelength with the optical thicknesses of said other pairs of layers of said low and high refractive index materials also being less and more, respectively, than one quarter of said preselected wavelength if $k_2/n_2$ is larger than $k_1/n_1$ or more and less, respectively, than one quarter of said preselected wavelength if $k_2/n_2$ is smaller than $k_1/n_1$.

5. A multilayer mirror as claimed in claim 4, wherein the values of said respective optical thicknesses of said layers in each pair are values which have been predetermined to maximize the reflectance of said mirror with that pair of layers in terms of the reflectance of the underlying substructure.

6. A multilayer mirror for reflecting radiation at a preselected wavelength comprising a substructure and a plurality of pairs of layers of first and second dielectric materials formed on one surface of said substructure and having complex refractive indices of $n_1 - ik_1$ and $n_2 - ik_2$, where $n_1$ and $n_2$ are the real components of the respective refractive indices, $k_1$ and $k_2$ are the respective extinction coefficients of said materials at said preselected wavelength, and the respective absorptances of said materials are determined by the values of $k_1/n_1$ and $k_2/n_2$ and are different; the first and second layers in each pair having optical thicknesses more and less, respectively, than one quarter of said preselected wavelength if $k_1/n_1$ is smaller than $k_2/n_2$ or less and more, respectively, than one quarter of said preselected wavelength if $k_1/n_1$ is greater than $k_2/n_2$, with the actual values of said optical thicknesses being chosen such that the overall reflectance of said mirror is substantially maximized and the optical thicknesses of the low and high refractive index materials in each pair are different from those in other pairs.

7. A multilayer mirror for reflecting radiation at a preselected wavelength comprising a substructure and a plurality of pairs of layers of materials of respective lower and higher complex refractive index formed on said substructure with the complex refractive index of the first and second layers on the side of incidence in each pair being expressed as $n_1 - ik_1$ and $n_2 - ik_2$, the values of the optical thicknesses of said first and second layers in each pair being more and less than one quarter of said preselected wavelength if $k_1/n_1$ is smaller than $k_2/n_2$ or less and more than one quarter of said preselected wavelength if $k_1/n_1$ is larger than $k_2/n_2$, with the actual value of said respective optical thicknesses of the materials in each pair of layers being different from those in all other pairs of layers and being chosen to be those values which substantially maximize the reflectance of said mirror with that pair of layers and any underlying pair of layers.

8. A multilayer mirror for reflecting radiation at a preselected wavelength comprising a substructure having a relatively high reflectance value and a pair of layers formed on said substructure of two different dielectric materials to provide an increased reflectance value, one of said materials being absorbing and the other of which is free of absorption, said mirror being constructed by the process of forming each of said layers in said pair to a substantially optimum optical thickness value chosen such that the overall reflectance of said mirror is substantially maximized at a value greater than the reflectance of a multilayer mirror in which a pair of layers of the same material are formed in the same sequence on a substantially identical substructure but with other optical thickness values.

9. A multilayer mirror for reflecting radiation at a preselected wavelength comprising a substructure consisting of a substrate and at least one pair of layers of two different dielectric materials formed on said substrate, one of which materials is absorbing and the other of which is free of absorption, and a pair of layers of said two different dielectric materials formed on said substructure, said mirror being constructed by the process of forming each of said layers in said final pair to a substantially optimum optical thickness value chosen independently of the optical thickness values of corresponding layers of the same material in said substructure such that the overall reflectance of said mirror is substantially maximized at a value greater than the reflectance of a multilayer mirror in which a final pair of layers of the same two materials are formed on a substantially identical substructure but with other optical thickness values.

10. A method of manufacturing a multilayer mirror for maximum reflectance of radiation at a preselected wavelength utilizing two different dielectric materials, one of which is slightly absorbing and the other of which is free of absorption, said process comprising the steps of forming sequentially on a selected substructure having a relatively high reflectance value first and second layers of said two materials with said second layer having optical thickness less than one quarter of said preselected wavelength if said second layer is absorbing or more than one quarter of said preselected wavelength if said first layer is absorbing and with both layers having optimum optical thickness values chosen such that the overall reflectance of said mirror is substantially maximized at a value greater than the reflectance of a multilayer mirror in which a pair of layers of the same two materials are formed on a substantially identical substructure but with other optical thickness values.

11. A method of manufacturing a multilayer mirror for reflecting radiation at a preselected wavelength utilizing two different dielectric materials, one of which is slightly absorbing and the other is free of absorption, said process comprising the steps of forming sequentially on a substructure consisting of a substrate and at least one pair of layers of said two materials first and second additional layers of said two materials with each of said layers having an optical thickness value being chosen independently of the optical thickness values of corresponding layers of material in said substructure such that the overall reflectance of said mirror is substantially maximized at a value greater than the reflectance of a multilayer mirror in which a pair of layers of the same material are formed on a substantially identical substructure but with other optical thickness values.

* * * * *

UNITED STATES PATENT AND TRADEMARK OFFICE
CERTIFICATE OF CORRECTION

PATENT NO. : 4,309,075

DATED : January 5, 1982

INVENTOR(S) : Joseph H. Apfel, Charles K. Carniglia

It is certified that error appears in the above-identified patent and that said Letters Patent are hereby corrected as shown below:

IN THE CLAIMS:

Claim 1, column 17, line 41, between "less" and "one" delete "then" and substitute therefor --than--.

Claim 1, column 17, line 51, between "and" and "optical" add --have--.

Signed and Sealed this

Eleventh Day of May 1982

[SEAL]

Attest:

Attesting Officer

GERALD J. MOSSINGHOFF

Commissioner of Patents and Trademarks